United States Patent
Martin et al.

[19]

[11] Patent Number: 5,836,203
[45] Date of Patent: Nov. 17, 1998

[54] MAGNETICALLY EXCITED FLEXURAL PLATE WAVE APPARATUS

[75] Inventors: Stephen J. Martin; Michael A. Butler, both of Albuquerque; Gregory C. Frye, Cedar Crest; James H. Smith, Albuquerque, all of N. Mex.

[73] Assignee: Sandia Corporation, Albuquerque, N. Mex.

[21] Appl. No.: 734,290

[22] Filed: Oct. 21, 1996

[51] Int. Cl.$^6$ ................................................ G01H 3/06
[52] U.S. Cl. .......................... 73/579; 73/24.06; 73/702
[58] Field of Search ................. 73/24.06, 61.49, 73/579, 643, 702, DIG. 1; 331/65; 422/82.01, 98

[56] References Cited

U.S. PATENT DOCUMENTS

| | | | |
|---|---|---|---|
| 4,248,092 | 2/1981 | Vasile et al. | 73/643 |
| 5,003,822 | 4/1991 | Joshi | 73/204.15 |
| 5,119,343 | 6/1992 | Katahara | 367/75 |

OTHER PUBLICATIONS

S. W. Wenzel, B. A. Martin and R. M. White, "Generalized Lamb–Wave Multisensor," *Proceedings of the 1988 Ultrasonics Symposium*, pp. 563–567 (1988).

S. W. Wenzel and R. M. White, "Flexural Plate–Wave Sensor: Chemical Vapor Sensing and Electrostrictive Excitation," *Proceedings of the 1989 Ultrasonics Symposium*, pp. 595–598 (1989).

S. W. Wenzel and R. M. White, "Flexural Plate–Wave Gravimetric Chemical Sensor," *Sensors and Actuators*, vol. A21–23, pp. 700–703 (1990).

J. W. Grate, S. W. Wenzel and R. M. White, "Flexural Plate Wave Devices for Chemical Analysis," *Analytical Chemistry*, vol. 63, pp. 1552–1561, Aug. 1, 1991.

*Primary Examiner*—John E. Chapman

[57] ABSTRACT

A non-piezoelectric flexural plate wave apparatus having meander-line transducers mounted on a non-piezoelectric membrane. A static magnetic field is directed perpendicularly to the conductive legs of the transducers in the plane of the membrane. Single-port, two-port, resonant, non-resonant, eigenmode, and delay-line modes may be employed.

16 Claims, 7 Drawing Sheets

"Prior Art"

MAGNETICALLY EXCITED FLEXURAL PLATE WAVE APPARATUS

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field)

The invention relates to apparatuses for exciting and detecting acoustic waves, and methods of using such apparatuses.

2. Background Art

Surface acoustic wave devices and flexural plate wave devices have a number of applications including frequency filtering, oscillator control, signal processing and sensors. Typically, flexural plate acoustic wave devices employed piezoelectric film as one layer of a membrane. Usually the membrane was fabricated using micromachining processes on a silicon wafer.

Several structural differences obtain between surface acoustic wave devices and flexural plate wave devices. Since the flexural plate wave device is fabricated on silicon it can easily be directly integrated with microelectronic circuits. Since the wave is excited in a thin membrane as opposed to a thick substrate, the wave velocity is much lower resulting in a lower operating frequency and simpler electronics. Additionally, the wave velocity is more sensitive to surface perturbations, for example, mass accumulation. This results in greater sensitivity in chemical sensor applications.

SUMMARY OF THE INVENTION (DISCLOSURE OF THE INVENTION)

The present invention is of an apparatus for and method of exciting flexural plate waves comprising: depositing a meandering conductor upon a non-piezoelectric membrane; directing a static magnetic field orthogonally to the conductor; and energizing the conductor with electric current. In the preferred embodiment, the meandering conductor comprises a plurality of parallel legs, and a second meandering conductor is also deposited upon the non-piezoelectric membrane. The excitation may be in single-port mode, two-port mode, eigenmode, resonant mode, non-resonant mode, or delay-line response mode.

A primary object of the present invention is the provision of a flexural plate wave apparatus requiring no piezoelectric material;

Another object of the invention is the provision of flexural plate wave apparatus highly compatible with microelectronic circuits;

Still another object of the invention is the provision of flexural plate wave apparatus operating at low wave velocity; and Yet another object of the invention is the provision of flexural plate wave apparatus where wave velocity is sensitive to surface perturbations.

A primary advantage of the present invention is its direct incorporation into microelectronics and integrated circuits;

Another advantage of the present invention is its noninterference with chemically-sensitive films; and Yet another advantage of the present invention is its ready adaptability as a sensitive pressure sensor.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. In the drawings.

DESCRIPTION OF THE PREFERRED EMBODIMENTS (BEST MODES FOR CARRYING OUT THE INVENTION)

Figure 1:
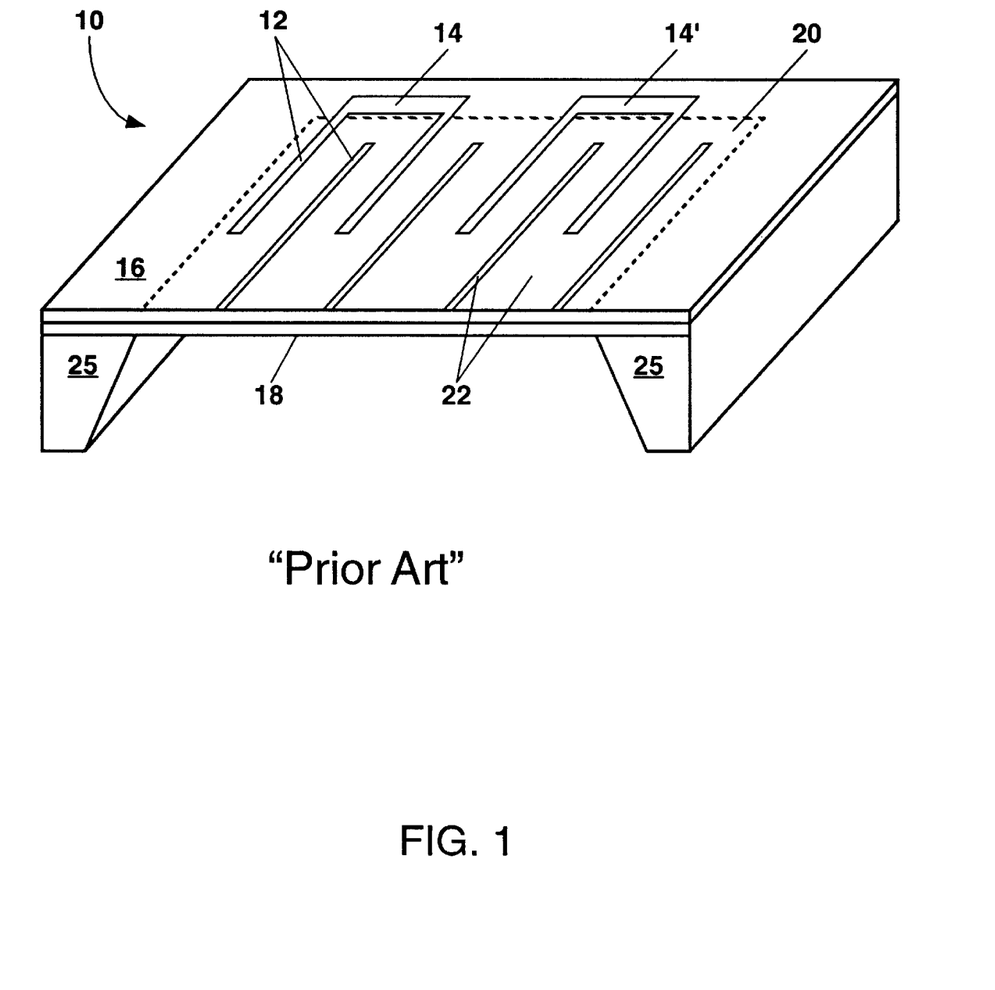
FIG. 1 is a perspective view of a prior art piezoelectric flexural plate wave device.

FIG. 1 illustrates a conventional prior art flexural plate wave device 10. Conductive interdigital electrodes 12 forming interdigital transducers 14,14' are patterned on piezoelectric film 16. In turn, piezoelectric film 16 is deposited on a silicon nitride (SiN) or poly-silicon layer 18. Membrane 20 comprises both layers. Base or support 25 is of silicon.

Figure 2:
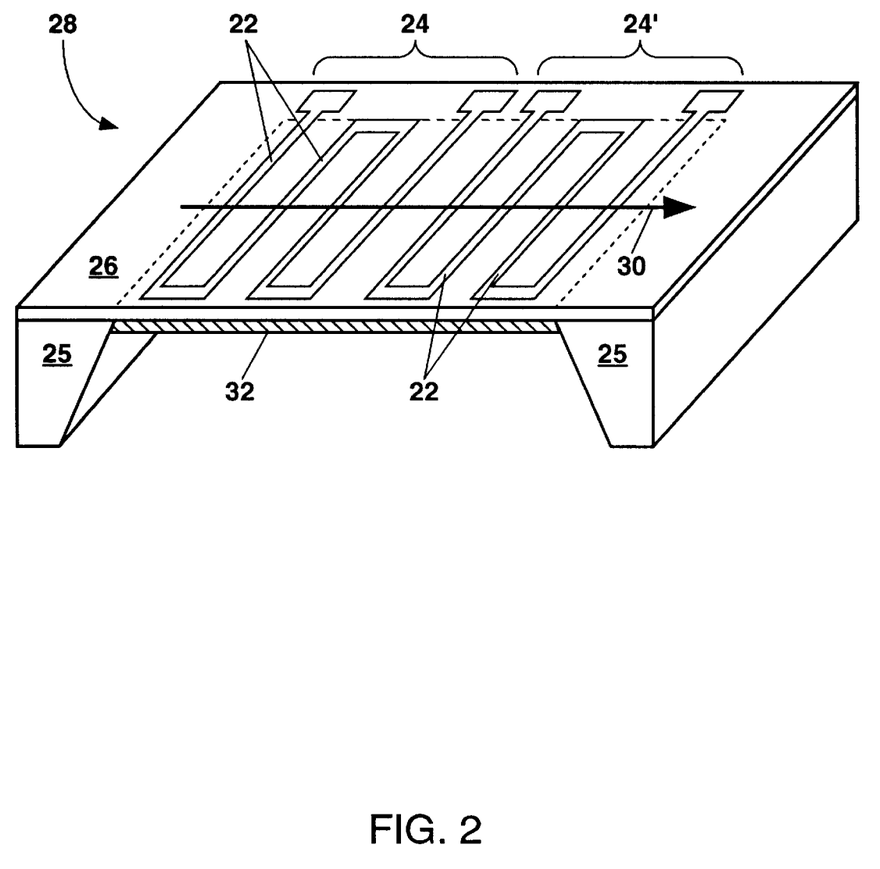
FIG. 2 is a perspective view of the flexural plate wave apparatus of the invention.

The preferred embodiment of the present invention is shown in FIG. 2. Flexural plate wave apparatus 28 comprises meander-line electrodes or conductors 22 (also termed herein as legs) forming meander-line transducers 24,24'. Meander-line transducers 24,24' are deposited on insulating, non-piezoelectric membrane 26, which is typically SiN or poly-silicon. Membrane 26 is supported by silicon base 25.

Figure 3A:
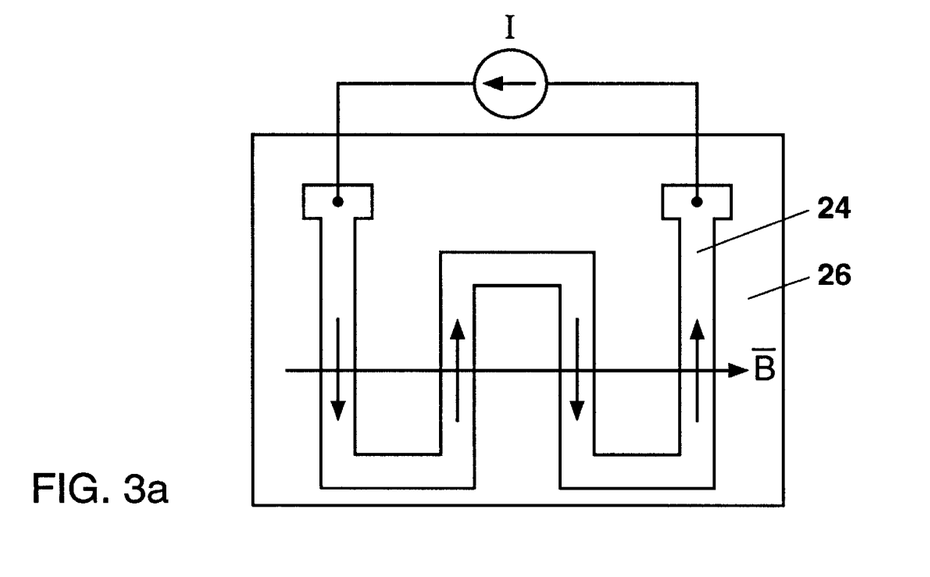
FIGS. 3A–3D are schematic diagrams showing interaction of current with an applied magnetic field, $\overline{B}$, with resulting Lorentz forces, $\overline{F}$, and motion.
Figure 3B:
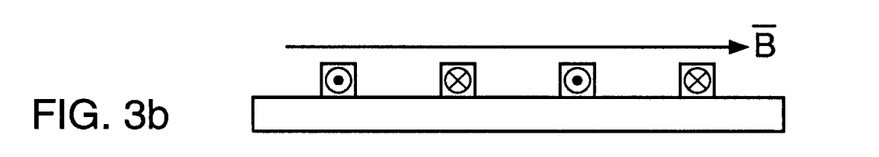
Figure 3C:
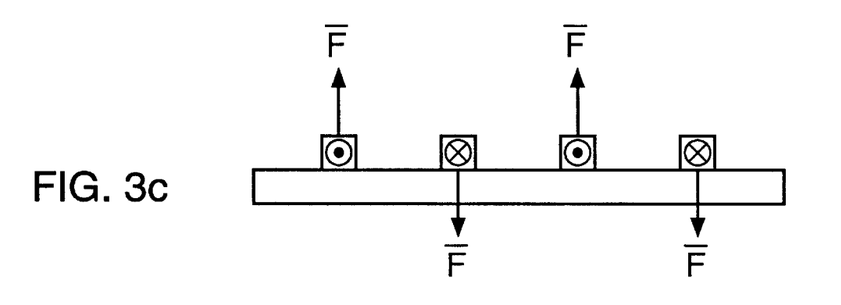
Figure 3D:
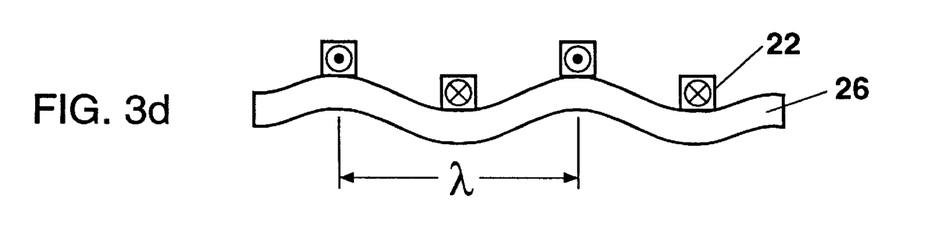

An orthogonal (to legs 22) static in-plane magnetic field, $\overline{B}$, 30 is applied, the source of which is not shown since either conventional permanent magnet or direct-current (DC) coils, or the like, may be used. Application of current to the legs 22 of a meander-line transducer 24 as depicted in the top view of FIG. 3A and side view of FIG. 3B results in surface-normal Lorentz forces, $\overline{F}$, directed according to the left-hand rule (motor action), as shown in the side view of FIG. 3C. The resulting induced wave motion (i.e. deformation of membrane 26) is as depicted in FIG. 3D. Force, $\overline{F}$, per unit length of conductor in given by $$\overline{F} = \overline{I} \times \overline{B} \qquad (1)$$

If alternating-current (AC) is applied to the meander-line transducer 24, the deformation is reversed every half-cycle, forming a standing wave (superposition of contra-propagating flexural plate waves).

Generation of wave motion in the membrane 26 by Lorentz forces, $\overline{F}$, has two results: (1) the motion of the meander-line transducer legs 22 in the magnetic field 30 generate a back-EMF (Electro Magnetic Field), which voltage opposes that originally applied to the meander-line transducer 24. This back-EMF changes the meander-line electrical impedance, specifically increasing resistance (motional resistance); and (2) the wave motion propagates along the membrane 26 and can be used to generate motion in legs 22' of a second "output" meander-line transducer 24', thereby generating an output voltage (right-hand rule, generator action) from the second transducer 24'.

The first result, above, is the basis for a single-port apparatus; the second result is the basis for a two-port apparatus: a signal can be input on one meander-line transducer 24 and extracted from a second meander-line transducer 24' as shown in FIG. 2.

Figure 4A:
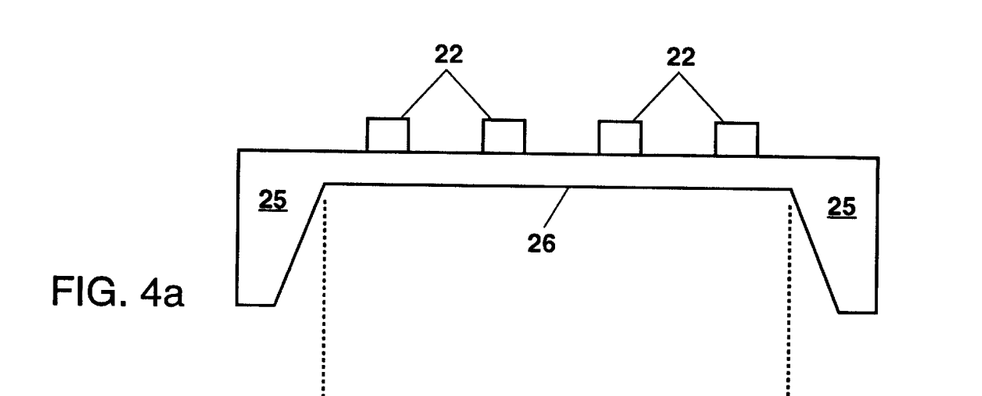
FIGS. 4A–4C depict a cross-sectional view of the membrane and eigenmode operation.
Figures 4B, 4C:
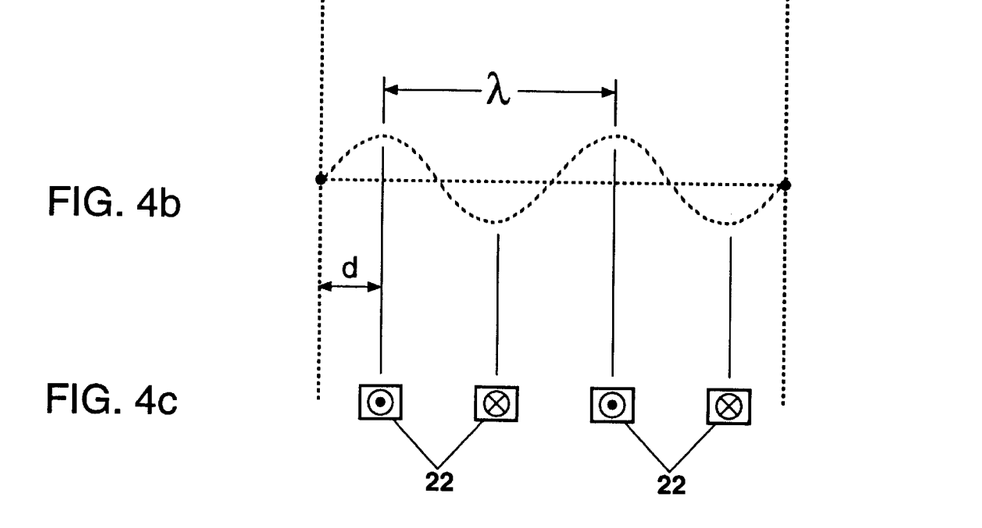

FIG. 4A depicts a cross-sectional view of membrane 26 along its length, with the membrane being attached at opposite ends to support 25. If the membrane ends are secured or "pinned" as shown in FIG. 4B, membrane 26 can execute an integral number of sinusoidal vibrations between one or both pairs of opposite ends of the membrane (e.g. for a rectangular membrane 26). This mode of vibration is denoted eigenmode. In the most general sense, the vibration is two-dimensional with a displacement, u, normal to the surface of the membrane 26 given by:

$$u(x,y) = A_{lm} \sin(k_l x) \sin(k_m y) \qquad (2)$$

where x and y are distances, respectively, along length, L, and width, W, of the membrane; $A_{lm}$ is an amplitude of the l,m eigenmode; $k_l = l\pi/L$; and $k_m = m\pi/W$.

In FIG. 4B, the surface of membrane 26 can undergo oscillatory motion with respect to its rest position (shown as the horizontal dashed line). The wavelength of the eigenmode is denoted $\lambda$. The frequency, f, at which the eigenmode is excited is $f = v/\lambda$ where v is the flexural plate wave velocity, determined by bending moment D and static stress T in the membrane. The meander-line transducer legs 22 must be properly positioned on the membrane 26 to excite this eigenmode. Current flow, I, in the legs of the meander-line transducer should coincide with membrane displacement maxima (antinodes) as shown in FIGS. 4B and 4C. This requires the meander-line transducer legs to be spaced $\lambda/2$ apart and to be positioned from the membrane edge a distance, d, given by:

$$d = \lambda/4 + n(\lambda/2) \qquad (3)$$

where n is an arbitrary integer and d is measured from the leg center. This condition can be met either with a single meander-line transducer (forming a single-port resonator) or with two meander-leg transducers (forming a two-port resonator).

Non-resonant devices can be made by suppressing membrane eigenmodes. One way to accomplish this is by fabricating a parallelogram (rather than rectangular) shaped membrane 26 that suppresses coherent wave reflection from the membrane edge. In this case, a broad-band response determined by the transducer bandwidth (and N, the number of meander-leg transducer periods) should be obtained for (1) the impedance variation versus frequency for a single-port device, or (2) the transmission between transducers for a two-port apparatus. The latter is referred to as a "delay line" response.

In a resonant apparatus, the meander-line transducer 24 couples to a standing wave; whereas in a non-resonant apparatus transducer 24 couples to propagating waves. In the latter case, element or leg spacing remains $\lambda/2$; meander-leg transducers 24,24' couple most effectively to waves with wavelengths twice the meander-leg transducer leg spacing. Corresponding to this, the center frequency, $f_0$, of the transducer is $f_0 = v/\lambda$.

Figure 5A:
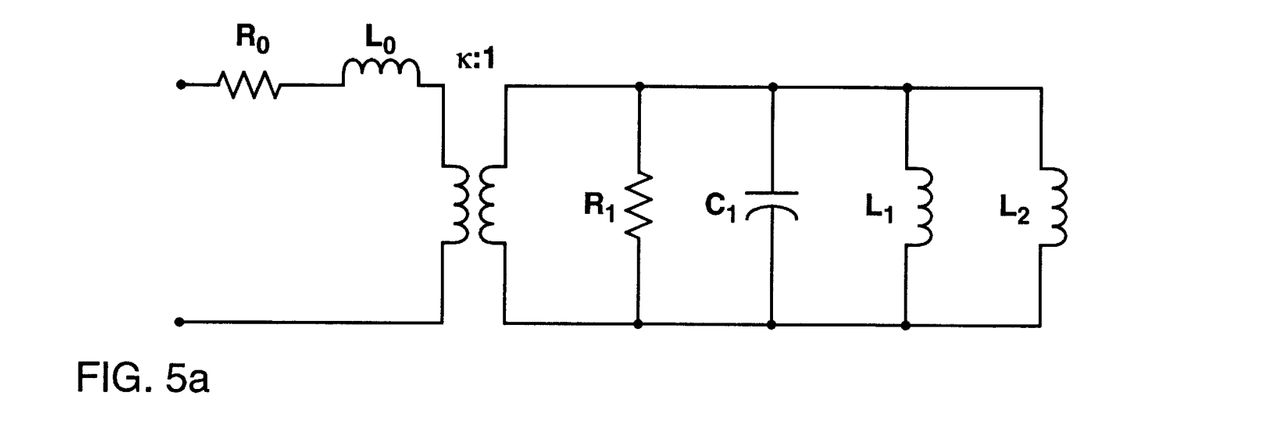
FIGS. 5A and 5B show equivalent circuit models for resonant one- and two-port apparatus.
Figure 5B:
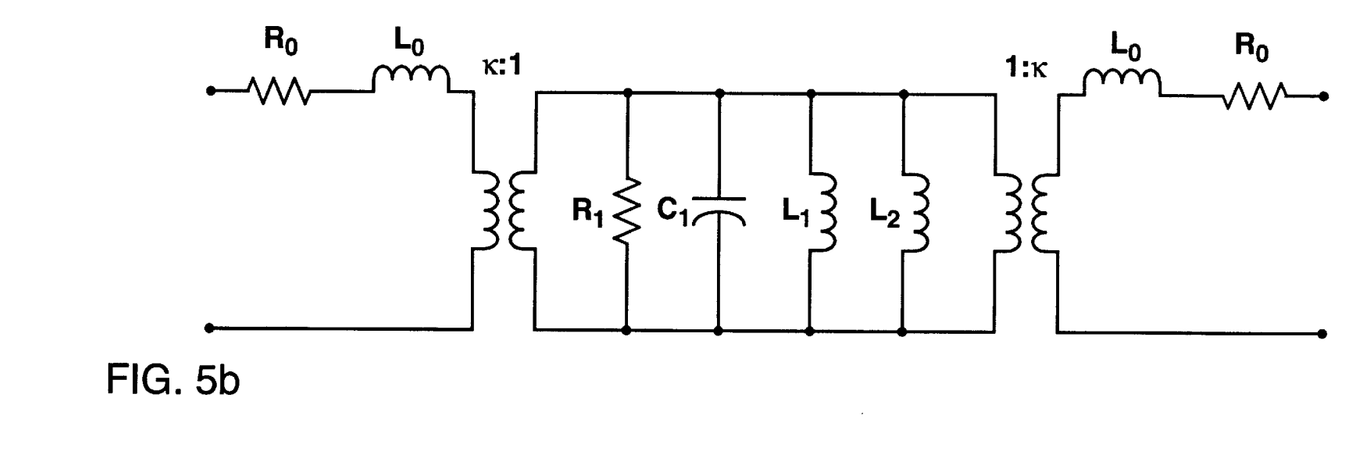

FIG. 5A shows an equivalent electrical circuit for a resonant single-port flexural plate apparatus while FIG. 5B illustrates an equivalent electrical circuit for a two-port resonant apparatus using meander-leg transducers. $R_O$ and $L_O$ represent ohmic resistance and inductance associated with the geometry of the meander-leg transducer 24, that is without coupling to a membrane mode. If the meander-leg transducer legs 22 are each $\lambda/4$ wide and have thickness t, then ohmic resistance is given by:

$$R_0 = \frac{8\rho N w'}{t} \qquad (4)$$

where $\rho$ is resistivity of the conductor forming the meander-leg transducer legs 22, N is the number of meander-leg transducer periods, and w' is the width (in wavelengths) of the transducer (i.e., transducer leg length).

The elements $R_1$, $C_1$, $L_1$ and $L_2$ are motional impedance equivalent circuit elements that arise from magnetic coupling to a membrane eigenmode given by:

$$R_1 = \frac{1}{Z_a} \qquad (5a)$$

$$C_1 = \rho h \qquad (5b)$$

$$L_1 = \frac{1}{Dk^4} \qquad (5c)$$

$$L_2 = \frac{1}{Tk^2} \qquad (5d)$$

where h is the membrane thickness, $\rho$ is the density of the material forming the membrane, k is the flexural plate wave wavenumber given by $k^2 = k_x^2 + k_y^2$, D is the bending moment of the membrane, T is the membrane stress, and $Z_a$ is a mechanical impedance due to air loading of the membrane and internal damping therein. In the above equations 5a–5d, $L_1$ and $L_2$ represent membrane strain energy; $C_1$ represents membrane kinetic energy; and $R_1$ represents power dissipated by compressional wave generation in air. Resonant absorption of energy occurs at parallel resonance between the motional inductances and capacitance. This occurs at $f_0 = v/\lambda$ when coherent excitation of the membrane eigenmode occurs. Excitation of membrane resonance occurs over a narrow bandwidth determined by membrane Q:

$$Q = \omega_0 R_1 C_1 = \frac{\omega_0 \rho h}{Z_a} \qquad (6)$$

The strength of meander-leg transducer coupling to the membrane 26 is determined from the transformer coupling (FIG. 5) factor $\kappa$, given by:

$$\kappa = a(BN)^2 w' Sinc(X) \qquad (7)$$

where a=28.8, B is applied magnetic field strength, and X is given by:

$$X = N\pi \frac{(f - f_0)}{f_0} \qquad (8)$$

The Sinc function (sin (X)/X) determines the bandwidth of transducer coupling. At the transducer's resonant synchronous frequency, $f_0$, coupling strength depends strongly on magnetic field strength, B, and the number of transducer periods, N (i.e. number of legs 22).

As seen in FIGS. 5A and 5B, the input impedance of the meander-leg transducer is dependent upon both the coupling factor, κ, and the motional impedance elements $R_1$, $C_1$, $L_1$ and $L_2$. The impedance on the right-hand side of the transformer can be brought to the input side by multiplying by $\kappa^2$. At parallel resonance, when reactance elements cancel and only motional resistance remains, the motional resistance measured at input is:

$$R_m \cong \frac{a(BN)^2 w'}{Z_a} \qquad (9)$$

where $Z_a$ is an air-loading impedance term.

Figure 6A:
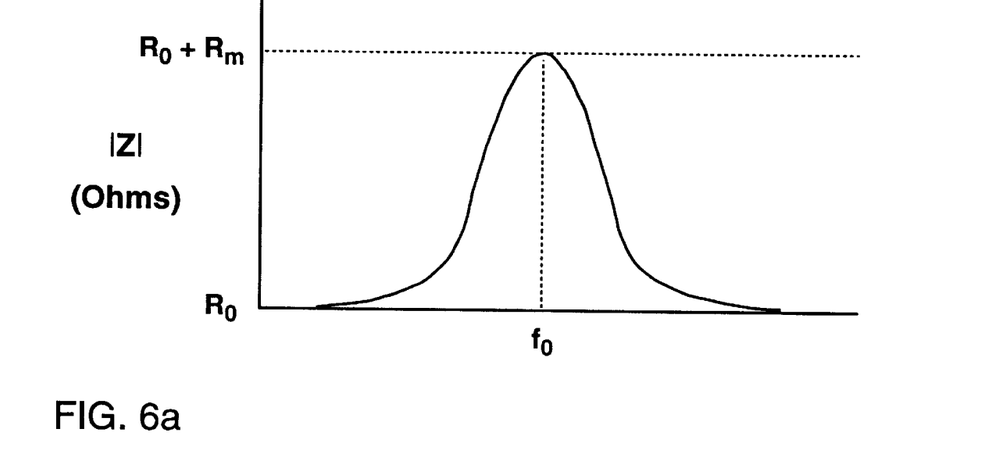
FIGS. 6A and 6B are graphs showing impedance magnitude and phase angle, respectively.
Figure 6B:
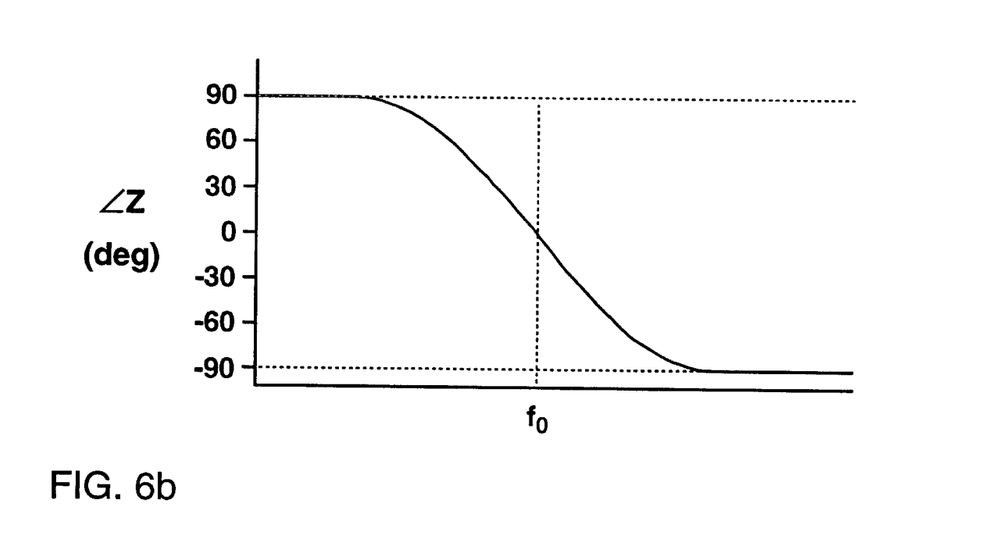

FIGS. 6A and 6B graphically illustrate variation of input impedance, Z, with frequency in the neighborhood of membrane resonance. Away from resonance (and neglecting input inductance), the impedance magnitude comprises ohmic resistance $R_0$; at resonance it comprises $R_0 + R_m$. Particular values for $R_0$ and $R_m$ can be predetermined according to Equations 4 and 9 above. The strong dependence of $R_m$ on air loading due to $Z_a$ indicates that air pressure can be a dominant factor in determining $R_m$.

Oscillator circuitry has been designed to operate single-port and two-port surface acoustic wave devices (see for example, U.S. Pat. No. 5,416,448). Accordingly, circuitry required to operate magnetically excited flexural plate wave apparatus should be similar. The single-port oscillator tracks the impedance phase (∠Z in FIG. 6B) while the two-port oscillator tracks the transmission phase.

Figure 7A:
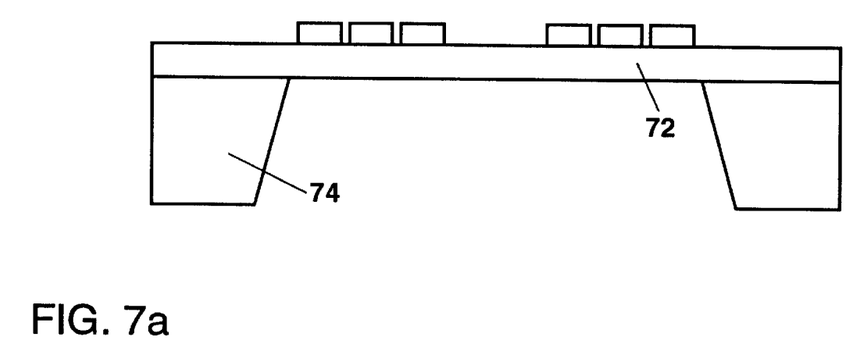
FIGS. 7A and 7B depict two methods of micromachining.

The meander-line transducer flexural plate wave apparatus can be constructed in several ways. FIG. 7A shows a membrane constructed using a bulk micromachining process in which a preferential etch is used to remove Si 74 from underneath the membrane 72 (typically SiN or poly-silicon).

Figure 7B:
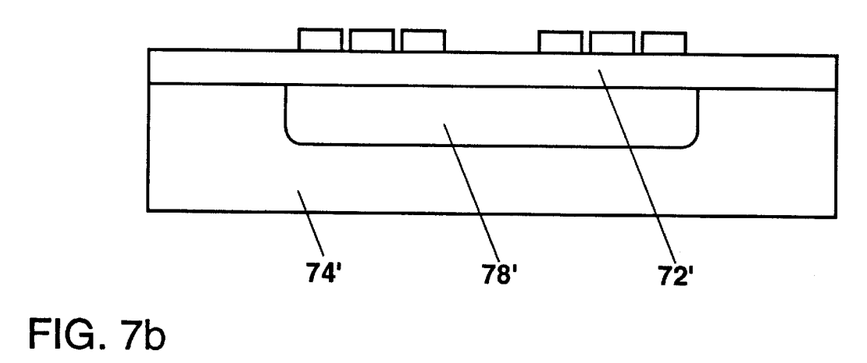

FIG. 7B illustrates a surface micromachining process in which the membrane 72' is grown over a sacrificial $SiO_2$ layer 78' (formed within a recess in Si layer 74') that is later removed by etching to release membrane 72'.

In one method of the surface micromachining process, a trench is etched in Si. $SiO_2$ is deposited over the wafer with thickness exceeding the depth of the trench. A chemical and/or mechanical polishing step is used to planarize the wafer. A membrane material, such as SiN or poly-silicon, is then deposited. A metal film is then deposited and photolithographically patterned to form the meander-line transducers. While protecting the meander-line transducers, the sacrificial oxide is then removed. (In order to decrease capacitive coupling it is advisable to form an oxide layer underneath any conductor not on the membrane and not remove this when etching away the sacrificial oxide.)

The magnetically-excited flexural plate wave device has several applications that are commercially important, including:

(1) Signal processing: This magnetically-excited flexural plate wave apparatus or device 28 according to the present invention could be used in place of surface acoustic wave devices for signal-processing applications such as frequency filtering, oscillator stabilization, etc. The advantage of the present device 28 is that it can be integrated alongside microelectronics and is compatible with standard integrated circuit processing. The present device 28 does not require a piezoelectric film and is thus more compatible with standard processing. Such a magnetically-excited flexural plate wave device 28 can be used in cellular phones and televisions for signal processing.

(2) Chemical sensors: The magnetically-excited flexural plate wave device 28 can be used as an extremely sensitive detector of one or more gas-phase chemicals. The chemical selectivity can be programmed or predetermined by coating one or both surfaces of the membrane (26 in FIG. 2) with a chemically-sensitive film 32 capable of binding a gas or vapor of interest. The magnetically-excited flexural plate wave device 28 has the advantage of not requiring piezoelectric films that may interfere with the chemically-sensitive film. Here again, integrating the device 28 with drive electronics allows extremely small sensors and sensor arrays to be formed.

(3) Pressure sensors: Variations in gas pressure can cause changes in the response of the magnetically-excited flexural plate wave device 28 (e.g. through $Z_a$). Thus, this device 28 can function as a pressure sensor. The market for pressure sensors is very large, particularly in automotive applications. An integrated version may be used to monitor tire pressure, for example.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A flexural plate wave apparatus comprising:
   a meandering conductor upon a non-piezoelectric membrane further comprising silicon nitride or polysilicon;
   a static magnetic field orthogonal to the conductor and aligned in-plane with the membrane; and
   means for energizing the conductor with an electrical current and thereby exciting flexural plate waves in the membrane.

2. The apparatus of claim 1 wherein the meandering conductor comprises a plurality of substantially parallel legs.

3. The apparatus of claim 1 further comprising a second meandering conductor upon said non-piezoelectric membrane.

4. The apparatus of claim 1 wherein the means for energizing the conductor with an electrical current excites flexural plate waves in a single-port mode.

5. The apparatus of claim 3 wherein the means for energizing the conductor with an electrical current excites flexural plate waves in a two-port mode.

6. The apparatus of claim 3 wherein the means for energizing the conductor with an electrical current excites flexural plate waves in a resonant mode.

7. The apparatus of claim 3 further comprising means for exciting flexural plate waves in a non-resonant mode.

8. The apparatus of claim 1 further comprising a chemically-sensitive film formed upon a surface of the membrane.

9. A method of exciting flexural plate waves comprising the steps of:
   a) depositing a meandering conductor upon a non-piezoelectric membrane further comprising silicon nitride or polysilicon;
   b) directing a static magnetic field substantially orthogonally to the conductor and substantially in the plane of the membrane; and
   c) energizing the conductor with electric current for exciting the flexural plate waves in the membrane.

10. The method of claim 9 wherein the step of depositing a meandering conductor comprises depositing a meandering conductor comprising a plurality of substantially parallel legs.

11. The method of claim 9 further comprising a step for depositing a chemically-sensitive film upon a surface of the membrane.

12. The method of claim 9 further comprising the step of depositing a second meandering conductor upon the non-piezoelectric membrane.

13. The method of claim 9 wherein the step of energizing the conductor with electric current excites flexural plate waves in a single-port mode.

14. The method of claim 12 wherein the step of energizing the conductor with electric current excites flexural plate waves in a two-port mode.

15. The method of claim 12 wherein the step of energizing the conductor with electric current excites flexural plate waves in a resonant mode.

16. The method of claim 12 wherein the step of energizing the conductor with electric current excites flexural plate waves in a non-resonant mode.

* * * * *